United States Patent
Zuccarino et al.

(10) Patent No.: US 10,008,028 B2
(45) Date of Patent: Jun. 26, 2018

(54) 3D SCANNING APPARATUS INCLUDING SCANNING SENSOR DETACHABLE FROM SCREEN

(71) Applicant: Aquifi, Inc., Palo Alto, CA (US)

(72) Inventors: Tony Zuccarino, Saratoga, CA (US); Abbas Rafii, Palo Alto, CA (US)

(73) Assignee: Aquifi, Inc., Palo Alto, CA (US)

( * ) Notice: Subject to any disclaimer, the term of this patent is extended or adjusted under 35 U.S.C. 154(b) by 0 days. days.

(21) Appl. No.: 15/382,210

(22) Filed: Dec. 16, 2016

(65) Prior Publication Data
US 2017/0178392 A1    Jun. 22, 2017

Related U.S. Application Data

(60) Provisional application No. 62/268,312, filed on Dec. 16, 2015.

(51) Int. Cl.
| | |
|---|---|
| *G06T 15/20* | (2011.01) |
| *H04N 13/02* | (2006.01) |
| *H04N 13/00* | (2018.01) |
| *G06T 19/00* | (2011.01) |

(52) U.S. Cl.
CPC ....... *G06T 15/205* (2013.01); *H04N 13/0059* (2013.01); *H04N 13/0239* (2013.01); *H04N 13/0253* (2013.01); *H04N 13/0296* (2013.01); *G06T 19/006* (2013.01); *H04N 2213/001* (2013.01)

(58) Field of Classification Search
CPC ...... G06T 15/205; G01S 17/89; G01B 11/005
USPC .............................................................. 356/4
See application file for complete search history.

(56) References Cited

U.S. PATENT DOCUMENTS

| | | | |
|---|---|---|---|
| 8,294,958 B2* | 10/2012 | Paterson | G01B 11/2518 358/1.9 |
| 8,892,252 B1* | 11/2014 | Troy | G01B 11/14 700/213 |
| 9,674,504 B1 | 6/2017 | Salvagnini et al. | |
| 2015/0185327 A1* | 7/2015 | Boeckem | G01S 17/89 356/4.01 |
| 2016/0291160 A1* | 10/2016 | Zweigle | G01S 17/89 |
| 2016/0327383 A1* | 11/2016 | Becker | G01B 11/005 |

OTHER PUBLICATIONS

Google search for NPL.*
Three-dimentional virtual touch display system for multi-user applications; Huang; 2013.*
Resolution adjustable 3D scanner based on using stereo cameras; Tzung.*
Szeliski, R., "Computer Vision: Algorithms and Applications", Springer, 2010 pp. 467-503.

* cited by examiner

*Primary Examiner* — Luis Perez Fuentes
(74) *Attorney, Agent, or Firm* — Lewis Roca Rothgerber Christie LLP

(57) ABSTRACT

A handheld three-dimensional scanning sensor including: a depth camera; a client communication interface; a controller; and a memory having instructions stored thereon that, when executed by the controller, cause the controller to: control the depth camera to capture an image; and transmit the image over the client communication interface.

15 Claims, 8 Drawing Sheets

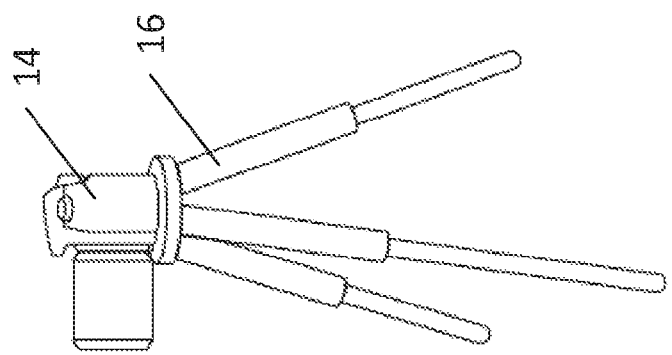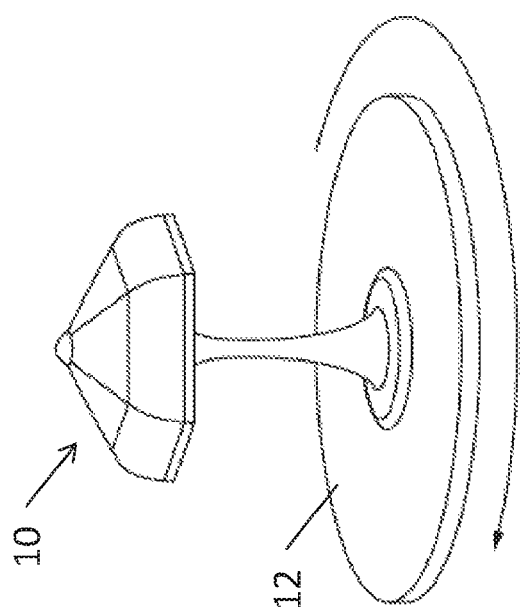
FIG. 1

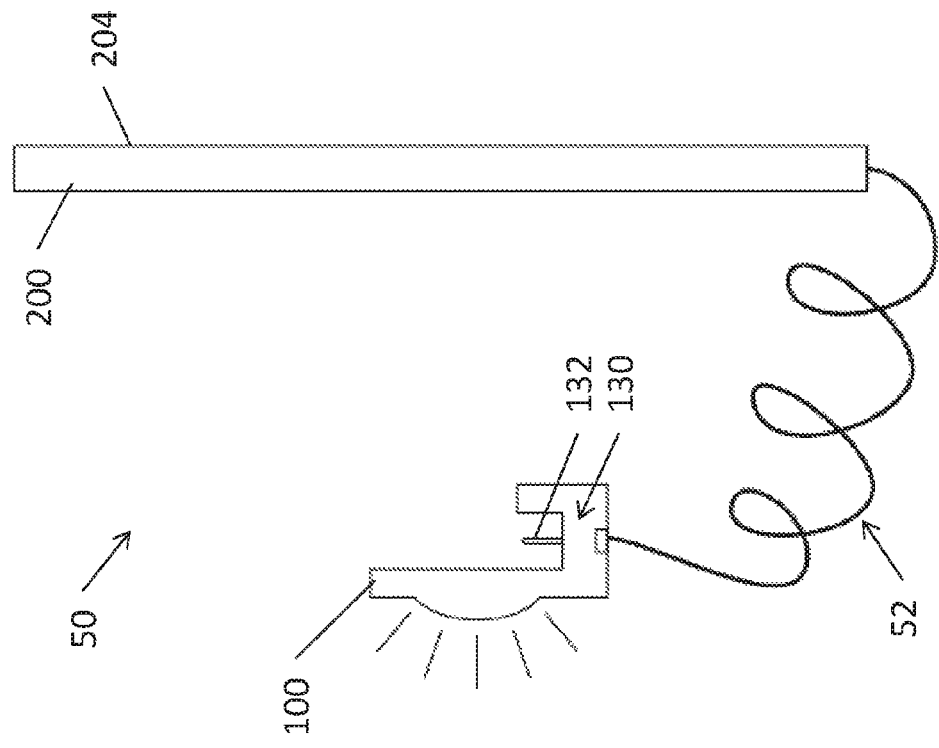
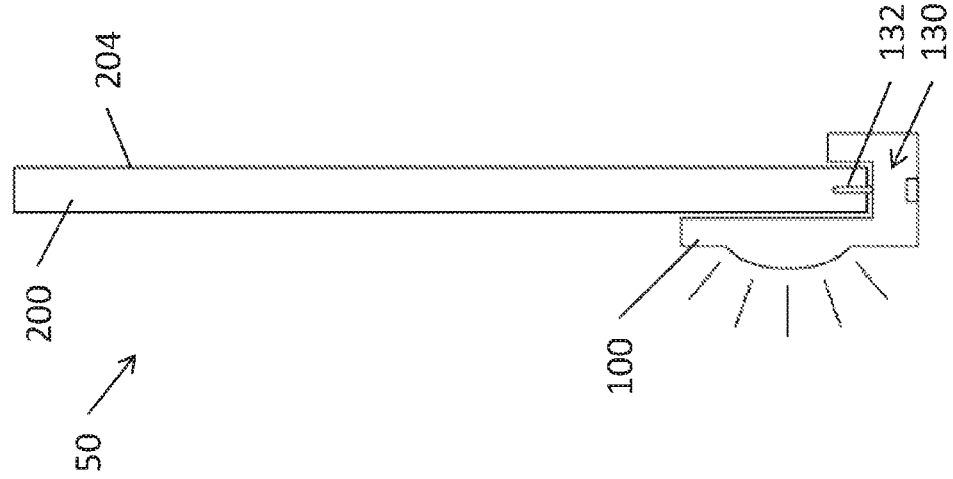

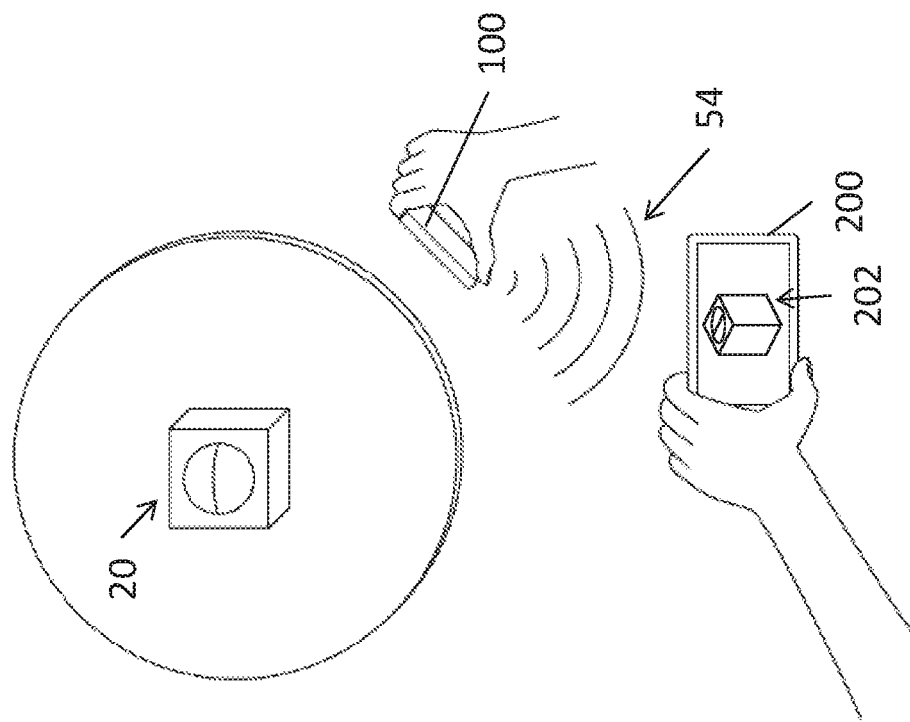
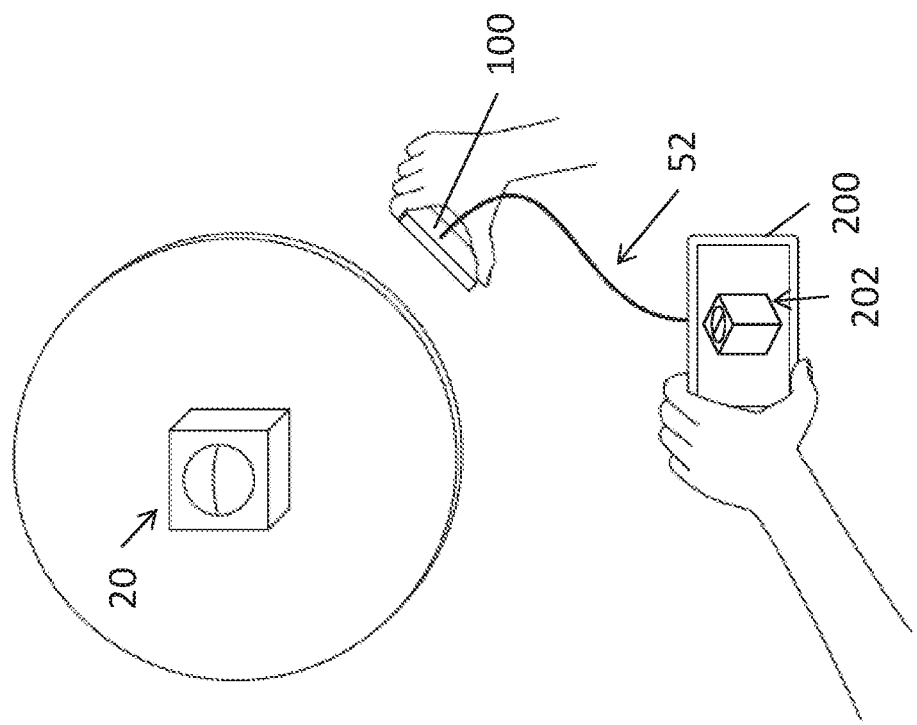

3D SCANNING APPARATUS INCLUDING SCANNING SENSOR DETACHABLE FROM SCREEN

CROSS-REFERENCE TO RELATED APPLICATION

This application claims the benefit of U.S. Provisional Patent Application Ser. No. 62/268,312, filed on Dec. 16, 2015, the entire disclosure of which is herein incorporated by reference.

BACKGROUND

A three-dimensional (3D) "mesh" model of a physical object can be produced by stitching together images of different sides of the object. Generating 3D models in this way presents the particular challenge that substantially all of the sides of the object need to be imaged in order to produce a complete model of the object. Failing to capture images of the object from some certain angles may result in holes, gaps, distortions, or other artifacts in the generated model (in some instances, the bottom surface of the object may be ignored if it is not relevant to the desired 3D model).

FIG. 1 shows one way of collecting images of an object 10 (e.g., a lamp) involving placing the object on a rotating platform 12 that rotates the physical object while a camera 14 remains in a fixed position. The technique shown in FIG. 1 may be appropriate for studio-like environments that provide a rotating platform, a camera stand or tripod 16, and appropriate lighting, but this may result in added cost due to the specialized equipment involved and due to the time and planning needed to bring the object to the studio environment for scanning.

FIG. 2 shows a free-form capture technique in which a user 22 captures images of a stationary object 20 using a camera 24 having an integrated screen or display. Such a camera 24 may be, for example, a standalone digital camera, a personal digital assistant, a smartphone, a tablet computer, or a custom scanner. The user 22 can walk around with the camera to image the various sides of the object 10. The set-up shown in FIG. 2 provides the freedom to scan objects in essentially any environment, without the need to bring the object to a studio and without the cost of acquiring additional specialized hardware such as a rotating platform and a camera stand.

As seen in FIG. 2, a user may encounter a usability problem when performing such a 3D scan of a stationary object 20 on a fixed platform (e.g., a table). In particular, as with shooting video, the user or camera operator 22 typically needs to watch the camera screen (or, for example, a smartphone screen if a smartphone camera is used or a camera fixture is attached to the display platform, as indicated by the dotted line in FIG. 2) in order to ensure that the object is within the frame during capture. For example, without this feedback, the user 22 may inadvertently capture images of the ceiling, the sky, or part of his or her hand instead of images of the object itself.

However, it can be challenging for a user to maintain a view of the camera screen during scanning. For example, when the object is low, as depicted in FIG. 2, the user needs to hold the camera level with the object, which can make it difficult for the user to be able to see the screen without crouching. As another example, it may be physically impossible for a user to maintain a view of the screen when there is not enough space to walk all the way around the object, such as when the object is against a wall, as shown in FIG. 2.

SUMMARY

Embodiments of the present invention are directed to a 3D scanning apparatus that decouples the scanning sensor module (e.g., a camera sensor module) from the scanning device module that includes a screen (e.g., a handheld processing module such as a smartphone or a wearable augmented reality (AR) or virtual reality (VR) device (e.g., goggles). The connection between the scanning sensor and the screen can be wired (e.g., tethered by a cable) or can be wireless (e.g., connected with a Bluetooth or a WiFi connection).

Using such a 3D scanning apparatus having a detachable scanning sensor, when scanning subjects of ordinary size, the user can remain substantially stationary (e.g., the user does not need to move his or her feet). The user can scan the subject by holding the scanning sensor in one hand and moving the scanning sensor around the object while keeping an eye on what the scanning sensor is capturing by viewing a screen held in the other hand. In addition, even when scanning larger objects, the detachable scanning sensor allows for easier scanning of the object from angles in which it would be difficult to view an attached screen (e.g., angles high above or below the object). In addition, in a wireless setup, the scanning sensor can be far away from the display of the scanning device or can be even in different locations depending on the nature of wireless interface between them, or mounted on a remote controlled robot or drone.

According to one embodiment of the present invention, a three-dimensional scanning system includes: a scanning sensor including an image sensor and a client communication interface; and a handheld scanning device including: a processor and memory; a screen; and a host communication interface, the processor being configured to: control the scanning sensor to capture images using the image sensor; receive the images from the scanning sensor through the host communication interface; and display the images on the screen in real time.

According to one embodiment of the present invention, a three-dimensional scanning system includes: a scanning sensor including an image sensor and a client communication interface; and a scanning device physically separable from the scanning sensor, the scanning device including: a processor and memory; a screen; and a host communication interface, the memory storing instructions that, when executed by the processor, cause the processor to: control the scanning sensor to capture images using the image sensor; receive the images from the scanning sensor through the host communication interface; and display the images on the screen in real time.

The scanning sensor may further include an inertial measurement unit configured to measure positions of the scanning sensor, and the scanning device may be further configured to receive the positions of the scanning sensor when capturing the images.

The memory of the scanning device may further store instructions that, when executed by the processor, cause the processor to compute a three-dimensional model based on the images received from the scanning sensor.

The memory may further store instructions that, when executed by the processor, cause the processor to overlay a rendering of the three-dimensional model on the screen.

The scanning sensor may further include a second image sensor arranged to have an overlapping field of view with the image sensor.

The scanning sensor may further include an illumination source configured to emit light in a direction of a field of view of the image sensor.

The illumination source may be configured to emit: structured light; coded light; or light having a pattern.

The client communication interface and the host communication interface may be wired interfaces.

The client communication interface and the host communication interface may be wireless interfaces.

The scanning sensor may include a depth camera, wherein the depth camera may be: a stereo vision depth camera; a time of flight depth camera; or a fusion color and infrared camera.

The scanning sensor may be a handheld scanning sensor.

The scanning sensor may be mounted on a drone.

According to one embodiment of the present invention, a three-dimensional scanning sensor includes: a depth camera; a client communication interface; a controller; and a memory having instructions stored thereon that, when executed by the controller, cause the controller to: control the depth camera to capture an image; and transmit the image over the client communication interface.

The three-dimensional scanning sensor may further include an inertial measurement unit configured to measure orientation information of the three-dimensional scanning sensor, wherein the memory further has instructions stored thereon that, when executed by the controller, cause the controller to receive the orientation information from the three-dimensional scanning sensor and to store the orientation information in association with the image.

The three-dimensional scanning sensor may further include a dock configured to be attached to a scanning device.

The dock may include a plug configured to connect to a receptacle of the scanning device.

According to one embodiment of the present invention, a method for controlling a three-dimensional scanning system including a scanning device and a scanning sensor, the scanning sensor being physically separate from the scanning device, includes: controlling, by a processor of the scanning device, the scanning sensor to capture a first image; receiving, by the processor, the first image from the scanning sensor; initializing, by the processor, a three-dimensional model based on the first image; controlling, by the processor, the scanning sensor to capture a second image; updating, by the processor, the three-dimensional model based on the second image; and outputting, by the processor, the three-dimensional model.

The method may further include: before outputting the three-dimensional model, determining whether to continue scanning or to stop scanning; in response to determining to continue scanning, controlling the scanning sensor to capture a third image; and in response to determining to stop scanning, finalizing the three-dimensional model.

The determining whether to continue scanning or to stop scanning comprises determining whether the three-dimensional model has a gap.

The determining whether to continue scanning or to stop scanning may include: receiving orientation information from an inertial measurement unit of the scanning sensor; and determining whether the scanning sensor has completed a full rotation.

The updating the three-dimensional model may include: transmitting the second image to a remote processing system; and receiving, from the remote processing system, the updated three-dimensional model.

BRIEF DESCRIPTION OF THE DRAWINGS

The accompanying drawings, together with the specification, illustrate exemplary embodiments of the present invention, and, together with the description, serve to explain the principles of the present invention.

FIG. 1 illustrates a comparative setup of scanning an object using a fixed camera and object placed on a rotating platform.

FIG. 5A is a schematic illustration of a 3D scanning system according to one embodiment of the present invention including a handheld scanning device with a screen on one surface of the scanning device and a detachable scanning sensor, where the detachable scanning sensor is physically attached or coupled to the handheld scanning device.

FIG. 5B is a schematic illustration of a 3D scanning system according to one embodiment of the present invention including a handheld scanning device with a screen one surface of the scanning device and a detachable scanning sensor, where the detachable camera is detached from the handheld scanning device.

FIG. 6A is a schematic illustration of a 3D scanning system according to one embodiment of the present invention where the scanning device and the scanning sensor are connected via a cable.

FIG. 6B is a schematic illustration of a 3D scanning system according to one embodiment of the present invention where the scanning system and the scanning sensor are connected via a wireless connection.

DETAILED DESCRIPTION

Figure 2:
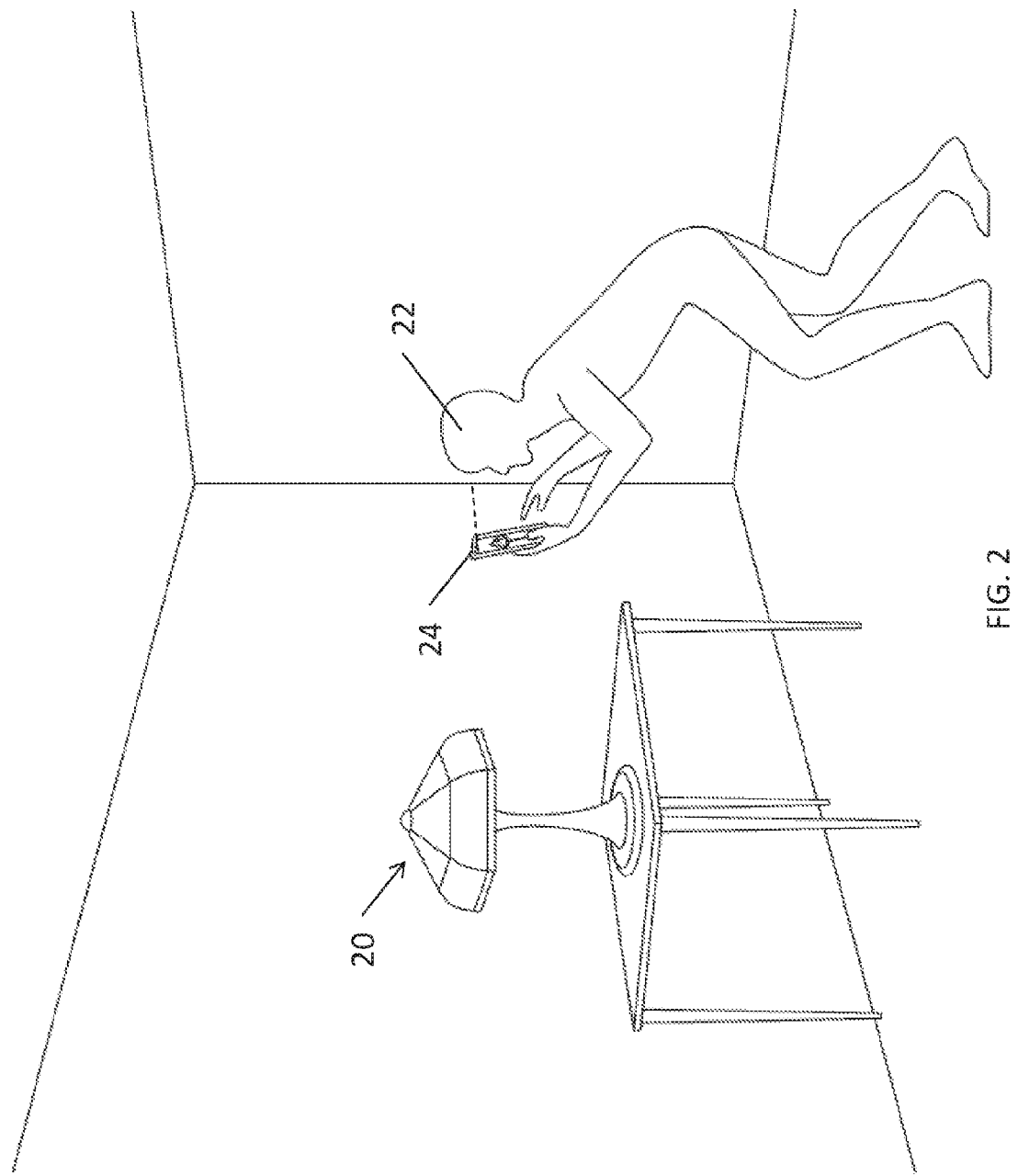
FIG. 2 illustrates a comparative setup of scanning a stationary object and moving the camera with an integrated display around the object to scan from different directions.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Aspects of embodiments of the present invention are directed to a 3D scanning apparatus that includes a scanning device module having a screen and a separable or detachable scanning sensor module, where the separable scanning sensor module is configured to capture image data and supply the supply image data to the scanning module. Aspects of embodiments of the present invention are also directed to a method for capturing images of physical objects using the 3D scanning apparatus, where the screen of the scanning module shows a live image representing the data captured by the separable scanning sensor module. The user holds the scanning device in one hand and the scanning sensor in the other hand, allowing the user to move the scanning sensor around the object while keeping the display in substantially in the same location. This allows the user to more easily watch what the scanning sensor is detecting while scanning the object.

Figure 3:
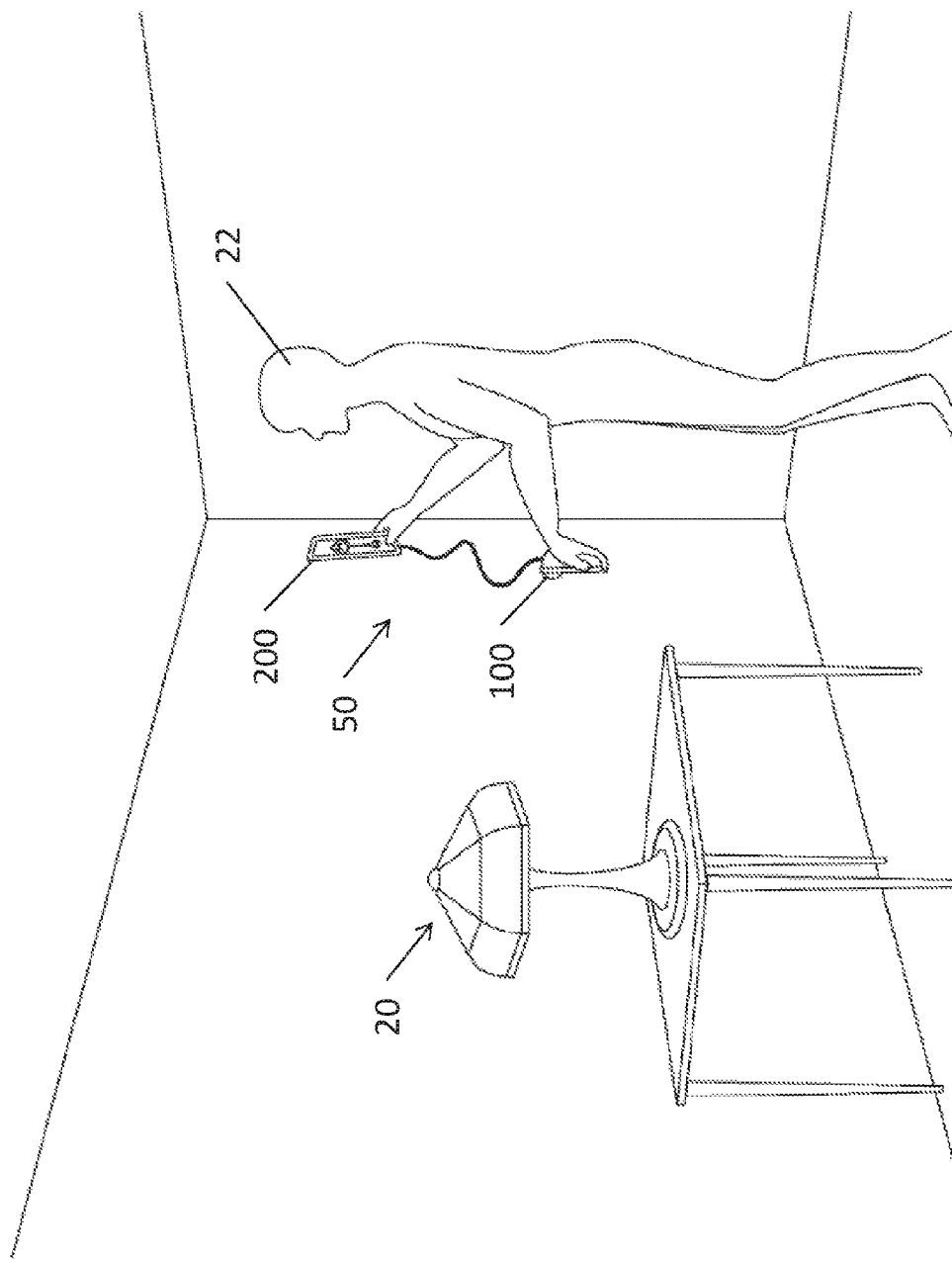
FIG. 3 illustrates a system and method for scanning an object in a fixed location using a 3D scanning system including a scanning sensor or camera separate from module including a screen according to one embodiment of the present invention.

FIG. 3 illustrates a system and method for scanning an object 20 in a fixed location using a handheld 3D scanning system 50 including a handheld scanning sensor or camera 100 separate from a handheld scanning device 200 including a screen or display 204 according to one embodiment of the present invention. As used herein, the term "handheld" refers to a device having a size and shape that is designed to be comfortably held in a person's hands. For example, most smartphones, tablets, and personal digital assistants may be referred to as "handheld" devices, whereas laptop computers are generally not "handheld."

During scanning, the user 22 can hold and view the scanning device 200 that includes the screen 204 in one hand while holding the scanning sensor module 100 in the other hand and moving the scanning sensor module 100 near the object 20. Because the scanning sensor module 100 is separate from the display on the scanning device module 200, the user can remain substantially still while capturing images of substantially all sides of the object. For example, the user can pan and tilt the scanning sensor module 200 (e.g., rotate the camera in a horizontal or vertical plane, respectively) without substantially changing the position of the display and, for small objects, the user does not need to walk around the object in order to maintain a view of the screen. Instead, the user can move the scanning sensor module 200 around the object while staying in place. Similarly, when augmented reality or virtual reality goggles (not shown in the figure) are used as the viewing device, it is more convenient to decouple the scanning sensor from the goggle to allow the user to freely capture many views of the object being scanned without straining the user's head and neck to obtain views of the object from various angles.

Figure 4:
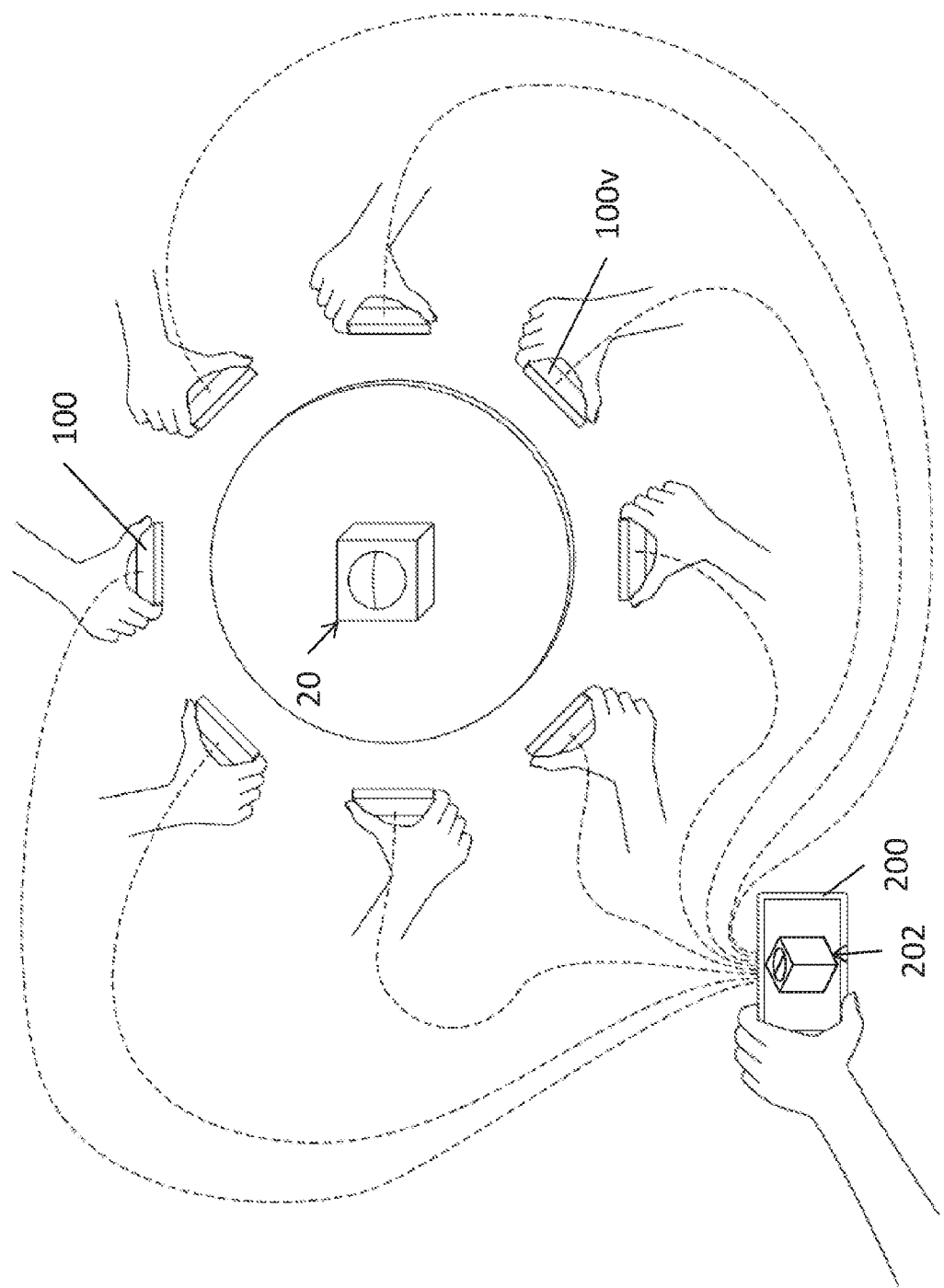
FIG. 4 illustrates, from the perspective of a user, a system and method for scanning an object using a 3D scanning system including a camera separate from a screen according to one embodiment of the present invention.

FIG. 4 illustrates, from the perspective of a user, a system and method for scanning an object 20 in a fixed location using a 3D scanning system 50 including a scanning sensor (or camera) separate from a screen according to one embodiment of the present invention. In particular, FIG. 4 illustrates a single scanning sensor module 100 at eight different physical positions around the object 20 at eight different points in time. The dotted line between the scanning sensor module 100 and the scanning device 200 indicates the data connection between the two pieces of hardware, where the scanning device 200 may transmit commands to the scanning sensor module 100 over the data connection, and the scanning sensor module 100 may transmit data, including images, to the scanning device 200.

As seen in FIG. 4, the user 22 may hold the scanning sensor module 100 (e.g., the camera) in one hand (depicted in FIG. 4 as the right hand) and may hold the scanning device 200 (e.g., a smartphone, tablet computer, personal digital assistant, or other handheld device with a display) in the other hand (depicted in FIG. 4 as the left hand). As shown in FIG. 4, the user may move the scanning sensor from the front of the object to the back of the object without changing the position of the scanning device 200. While the user scans the object 20 (as shown in FIG. 4, a tissue box) with the scanning sensor, the scanning device 200 displays a view 202 (e.g., a real time view) or representation of the images captured by the scanning sensor module. As depicted in FIG. 4, the user may have a more top-down view of the object 20, but the user 22 may position the scanning sensor module 100 to have a side view of the object 20. The view 202 on the scanning device 200 shown in FIG. 4 corresponds to the side view image captured by the scanning sensor module 100 at position 100v. This may enable the user 22 to scan the object 20 more easily and comfortably by manipulating the position of the scanning sensor module 100 without having to contort his or her body to maintain sight of the view 202 on the display of the scanning device 200. Therefore, the user receives real time feedback regarding the data being captured by the scanning sensor, thereby helping to ensure that all sides of the object, including the top, are imaged by the scanning sensor.

Without this feedback, a user may inadvertently orient the scanning sensor in a direction that fails to capture useful images of the object. For example, the user may inadvertently capture images of the ceiling or the floor, or may capture images of the background. In addition, in a comparative imaging system in which the camera and the display are rigidly fixed to one another, the fixed relationship between the field of view of the camera and the viewing direction of the display of the imaging system can make it difficult for the user to maintain a view of the screen while scanning all sides of the object.

FIG. 5A is a schematic illustration of a 3D scanning system 50 including a scanning device 200 (e.g., a portable device such as a smartphone or tablet) having a screen 204 on a surface of the scanning device 200 and a scanning sensor 100, where the scanning sensor 100 is physically attached to the bottom edge of the scanning device. The scanning sensor may include a dock that is configured to accommodate the scanning device. The dock 130 may include various types of temporary fasteners including, for example, clamps, magnets, and latches. In some embodiments, the dock 130 of the scanning sensor module 100 includes a plug 132 that is configured to mechanically attach to a corresponding receptacle of the scanning device 200. The receptacle of the scanning device 200 may be, for example, a USB Micro-A, USB Micro-B, USB Micro-AB, or USB Micro-C receptacle or an Apple® Lightning® receptacle of the scanning device 200, however, embodiments of the present invention are not limited thereto and the receptacle may be another type of receptacle or port, such as an audio (3.5 mm) jack. In still other embodiments, the scanning sensor module 100 may be attached to the scanning device 200 in other ways, such as connecting to fasteners of a case for the scanning device 200 (e.g., an injection molded case formed of, for example, thermoplastic polyurethane).

FIG. 5B is a schematic illustration of the 3D scanning system 50 of FIG. 5A where the detachable scanning sensor 100 is physically detached from the scanning device 200 and in communication with the scanning device (e.g., electrically connected to) the scanning device 200 via a cable 52. The cable may be retractable and may be coiled within the scanning device 200 and/or the scanning sensor 100 when physically attached to the portable device, as in FIG. 5A. In some embodiments of the present invention, the cable 52 may be connected to the proximal end of plug 132 such that the plug 132 remains connected to the scanning device 200 when the cable is extended. In other embodiments, the decoupled sensor design can conform to the design characteristics of the particular embodiment. For example, when a pair of goggles is used in a scanning application, the connection may be a wire attached to the temples of the goggles.

FIG. 6A is a schematic illustration of a 3D scanning system 50 according to one embodiment of the present invention where the scanning device 200 and the scanning sensor 100 are connected via a cable 52 (e.g., a universal serial bus or USB connection). Using the cable, the scanning sensor provides image data to the scanning device in real time (or substantially real time) while scanning, thereby providing the user with real time feedback regarding the images that are being captured by the scanning sensor. In addition, the scanning device 200 may remotely control the scanning sensor 100 via the cable 52, such as by transmitting commands to start and stop the capture of images, to activate or deactivate an illumination source, or to set exposure parameters for the images or set projection power parameters for the illumination source.

In some embodiments, the scanning device 200 is a smartphone or a tablet computer that includes a USB port and the scanning sensor 100 may be connected to and communicate with the smartphone using the USB On-the-Go specification. In some embodiments, the scanning sensor 100 receives power over the wired connection. In other embodiments, the scanning sensor 100 is self-powered by a power source internal to the scanning sensor, such as a battery or a large capacitor.

FIG. 6B is a schematic illustration of a 3D scanning system 50 according to one embodiment of the present invention where the scanning device 200 and the scanning sensor 100 are connected via a wireless connection 54. In a manner similar to that of the wired embodiment of FIG. 6A, using the wireless connection 54, the scanning sensor provides image data to the scanning device in real time (or substantially real time) in order to provide the user 22 with real time feedback regarding the images being captured by the scanning sensor 100. Similarly, the wireless connection can also be used to control the scanning sensor 100 in a manner similar to that described above with respect to the wired embodiment of FIG. 6A. The wireless connection may be, for example, a Bluetooth connection or a WiFi connection (e.g., an IEEE 802.11 wireless connection).

Embodiments with a wireless connection are also useful for applications in which the scanning sensor is mounted on a robot such as a drone or a ground-based robot. For instance, the drone can carry the scanning sensor 100 around objects like a building or a statue that are quite un-reachable to the user. A ground station such as a portable computing device can perform the scanning device functions of building the model and providing additional feedback to the user (or drone) during the process of scanning by, for example, displaying the images captured by the scanning sensor. As another example, an industrial robot in a manufacturing context may have a scanning sensor (e.g., attached to an arm) to perform scans of the products being manufactured in order to generate 3D models of the products for quality assurance. As still another example, a ground based robot may carry the sensor into conditions that would otherwise be difficult for humans to reach, such as tight spaces or hazardous conditions such as for firefighting and for use in radioactive environments.

Figure 7:
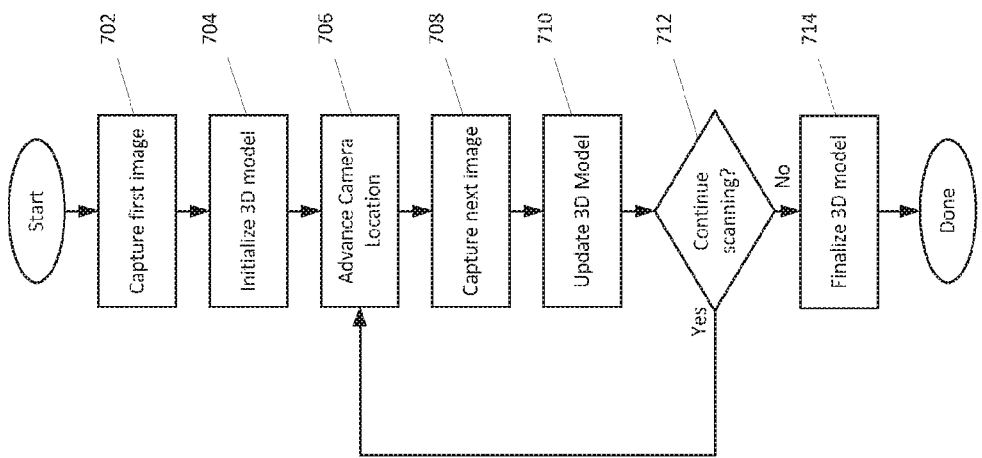
FIG. 7 is a flow chart of a method for performing a scanning session using a 3D scanning device with a detachable camera module according to one embodiment of the present invention.

FIG. 7 is a flow chart of a method for performing a scanning session using a 3D scanning system 50 with a detachable scanning sensor module 100 according to one embodiment of the present invention. As shown in FIG. 7, in operation 702, the scanning sensor (or camera module) 100 captures a first image (e.g., the scanning device 200 may supply a command to the scanning sensor 100 to capture an image). The scanning device (or portable display module) 200 displays the first image on the screen 204 and, in operation 704, uses the first image to initialize a three-dimensional model (the initialization and subsequent updates of the 3D model may be performed locally by the processor of the scanning device 200 or by a remote, cloud-based model generation service, or combinations thereof, such as generating a low-fidelity model by the scanning device and generating a high-fidelity model remotely). A user may then advance (or move) the scanning sensor 100 to a new location while holding the scanning device 200 with the display. In operation 706, the scanning sensor 100 may detect the change in position (e.g., using an inertial measurement unit), and in operation 708, may capture a next image (e.g., the scanning device 200 may control the scanning sensor 100 to capture the next image) and supply the next image to the scanning device 200. The rate at which the camera module captures images may be a single shot at a time (e.g., as controlled by a user or as controlled based on analyzing the position of the scanning sensor and overlaps with previously captured images) or may be at a sufficiently high frame rate so as to be a substantially continuous (e.g., 15 frames per second or more) stream. In some embodiments, the scanning sensor 100 may supply a low-resolution video to the scanning device 200 to serve as a real-time or substantially real-time preview of the view of the scanning sensor and may capture and output a high resolution image in response to a command from the scanning device 200. In operation 710, the scanning device 200 updates the 3D model based on the captured image. The updates may include adding new surfaces to the model and/or adding color information to the model. In addition, in some embodiments, the three-dimensional model and the captured images can be combined on the screen. For example, the three-dimensional model may be rendered and overlaid on the image received from the scanning sensor 100, where the three-dimensional model is rotated and scaled to match with the image shown on the screen. In this embodiment, gaps in the three-dimensional model may be shown or highlighted on screen (e.g., in a single color or in a bright pattern) to assist the user in visualizing which portions of the object have not yet been scanned. In another embodiment, the images captured by the scanning sensor 100 may be mapped onto the 3D model and the screen 204 may render a live preview of the 3D model, where the angle or viewpoint of the 3D model is determined based on the orientation and position of the scanning sensor 100 with respect to the imaged object 20.

The 3D model can be initialized, updated, and generated from the images captured by the scanning sensor 100 by applying depth reconstruction techniques. For example, in the case of a scanning sensor 100 that includes multiple cameras, each time an image is captured at a location, the multiple cameras capture separate images from different viewpoints. These multiple images can be used to generate a depth map of a scene by applying stereo depth reconstruction techniques (e.g., applying feature matching to identify the locations of features captured in the multiple images and calculating a disparity map from the distances of the matching features), as described, for example, in R. Szeliski. "Computer Vision: Algorithms and Applications", Springer, 2010 pp. 467 et seq. and/or by applying multi-view stereo reconstruction techniques as described, for example, in Szeliski pp. 492 et seq.

In operation 712, the scanning device 200 may determine whether to continue scanning. This determination may be based on, for example, whether all sides of the object have been captured in accordance with analyzing whether the scanning sensor 100 has completed a full rotation (e.g., made a 360° rotation, based on data from an inertial measurement unit in the scanning sensor 100) or in accordance with an analysis of the captured image data and/or the 3D model, such as determining whether the 3D model has any gaps or holes. If scanning is to continue, then the user may continue to advance the camera to a new location, and, in operation 706, the scanning process continues with detecting a new location of the camera and capturing another image in operation 708. If scanning is to stop, for example, because images of all sides of the object have been captured, then the scanning device 200 terminates the scanning process (e.g., by sending a stop or shutdown command to the scanning sensor 100). In some embodiments, the user may manually terminate the scanning process in order to handle situations where the user does not want a full model of all sides of the object or in situations where the system fails to determine that all sides have been captured.

After the scanning process is complete, the scanning device 200 may, in operation 714, finalize the 3D model, e.g., by cleaning or smoothing rough edges, removing outliers, performing texture mapping, etc. The finalized 3D model may then be scored or published (e.g., provide to other applications).

In some embodiments, the analysis of the images and the computation of the 3D model (e.g., the initialization, updating, and finalizing), or portions thereof, may be performed by a remote computer system different from the portable display module, such as by a separate standalone computer (e.g., a laptop or a desktop computer) or by a cloud-based (e.g., Internet connected) processing system. The images may be transmitted to the remote computer system via a computer network (e.g., the Internet).

Figure 8B:
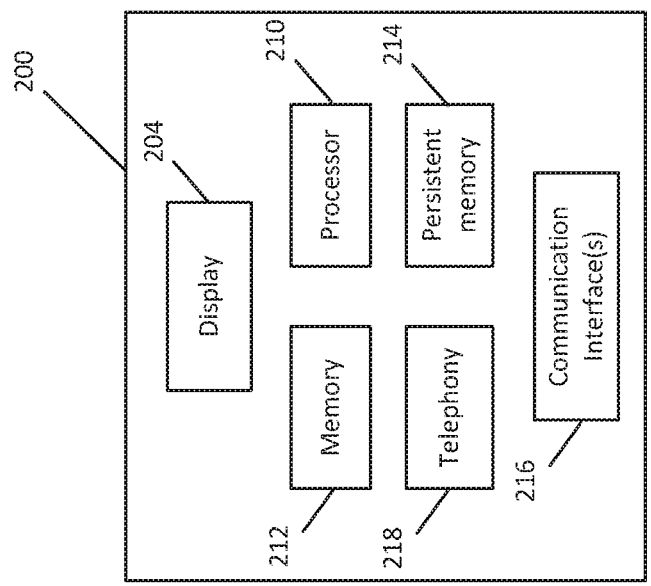
FIG. 8B is a block diagram illustrating a portable display device according to one embodiment of the present invention.
Figure 8A:
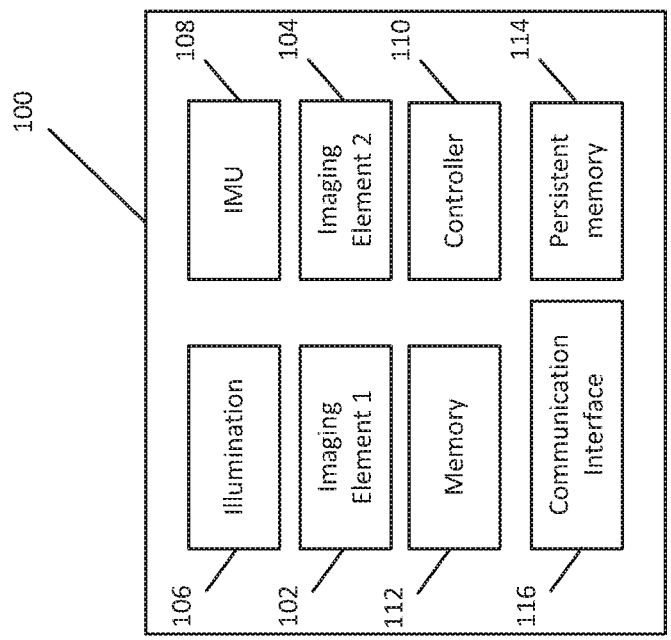
FIG. 8A is a block diagram illustrating a detachable imaging module according to one embodiment of the present invention.

FIG. 8A is a block diagram illustrating a detachable scanning sensor module or imaging module 100 according to one embodiment of the present invention. As shown in FIG. 8A, the scanning sensor module 100 includes a first image sensor 102 (Imaging Element 1) and a second image sensor 104 (Imaging Element 2). However, embodiments of the present invention are not limited thereto and the scanning sensor module may have a single image sensor or more than two image sensors. In some embodiments, different ones of the image sensors may capture light from different portions of the electromagnetic spectrum. For example, one image sensor may capture visible light, and another image sensor may capture infrared light. In some embodiments of the present invention, a single image sensor may be configured to capture both visible light and infrared light. The image sensors 102 and 104 may be located behind corresponding lenses or optical systems, where the first image sensor 102 in combination with the first lens may be referred to as a first camera, and the second image sensor 104 in combination with the second lens may be referred to as a second camera. The first and second cameras may be spaced apart and arranged to have overlapping fields of view.

In some embodiments, the imaging module includes a depth camera such as a time-of-flight depth camera, a stereo vision depth camera (e.g., the combination of imaging elements 1 and 2 or image sensors 102 and 104), and a fusion stereo, color and infrared camera (e.g., the combination of at least one color or visible light camera and at least one infrared camera). In one embodiment of the present invention, the depth camera is a trinocular camera system, such as the camera system described in U.S. patent application Ser. No. 15/147,879, "Depth Perceptive Trinocular Camera System," filed in the United States Patent and Trademark Office on May 5, 2016, the entire disclosure of which is incorporated by reference, where the trinocular camera system may include two infrared cameras and one color (e.g., visible light) camera.

In some embodiments, the scanning sensor module 104 includes an illumination module 106 to provide general illumination (e.g., substantially uniform light) in the direction of the fields of view of the first and second cameras. In other embodiments, the illumination module may provide structured light, coded light, or light having a pattern in the direction of the fields of view of cameras. The pattern may be, for example, a pattern of dots where, in any given portion of the pattern, the arrangement of dots is unique across the entire pattern emitted by the illumination module 106. In embodiments where the illumination module 104 emits patterned light, the pattern may change over time. The illumination module may emit visible light, infrared light, or both. In some embodiments, the illumination module is a laser projection source configured to emit light in a range that is detectable by one or more image sensors of the imaging sensors 102 and 104. In embodiments using a coherent light source such as a laser projection source, illumination module 106 may include diffractive optics to emit a pattern onto the scene that is imaged by the imaging sensors 102 and 104.

In some embodiments, the scanning sensor may also include an inertial measurement unit (IMU) 108 (e.g., one or more gyroscopes, accelerometers, and/or a Global Positioning System (GPS) receiver). The IMU 108 can be used to detect the orientation and/or position of the scanning sensor 100 at the time that the images are collected, which may be supplied to the scanning device 200 along with the image data. The position and orientation data may provide additional information to assist in the reconstruction of the 3D model.

The scanning sensor module 100 also includes a controller 110 (e.g., a microcontroller or system on a chip) and memory 112. The memory 112 may store instructions (e.g., software) executed by the controller 110 and may also be used to store image data captured by the imaging elements 102 and 104 and data collected by other sensors of the imaging module including the IMU 108. The scanning sensor module 100 may further include a persistent memory 114 (such as flash memory) for storing the software for operating the controller (e.g., for storing the software while the scanning sensor module 100 is powered off). The software may be executed by the controller 110 to control the image capture operations of the imaging elements 102 and 104, to control the illumination source 106, to read data from the IMU 108, and to transmit data via a communication interface 116.

The client communication interface 116 of the scanning sensor module 100 may include a wired connection interface (e.g., a USB controller) and/or a wireless communication interface (e.g., a Bluetooth or WiFi modem). The client communication interface 116 may be used to receive commands from the host scanning device (e.g., to begin and/or end capture) and to transmit the captured image data to the host scanning device 200.

FIG. 8B is a block diagram illustrating a scanning device 200 (or portable display device or host module) according to one embodiment of the present invention. The scanning device 200 includes a processor 210. In some embodiments, the processor 210 is a general purpose microprocessor. In other embodiments, the processor 210 is, or may include, a graphics processing unit. The scanning device module 200 includes memory 212 that stores instructions (e.g., software) that, when executed by the processor 210, cause the processor to control the detachable scanning sensor module 100 using the communication interface(s) 216, to collect the image data received from the detachable scanning sensor module 100, and to generate a 3D model based on the received image data. The scanning device may also include persistent memory 214 (e.g., flash memory), which may store the software executed by the processor, as well as data (e.g., captured images and generated 3D models). The communication interface(s) 216 may include a USB controller, a Bluetooth modem, and/or a WiFi modem, and may be referred to as a host communication interface 216. In embodiments where the scanning device 200 is a cellular enabled device, it may also include telephony hardware 218 for communicating with a cellular telephone and/or data network.

In some embodiments, the scanning device may be a smartphone and may therefore include telephony components such as a cellular modem. In other embodiments, the scanning device may be an augmented reality (AR) or virtual reality (VR) wearable with integrated binocular-like viewing apparatus.

In some embodiments, the scanning device module may be configured to generate three-dimensional (3D) models of physical objects based on the captured image data. In other embodiments of the present invention, the image data captured by the 3D scanning apparatus may be transmitted to an external computing device (e.g., a cloud based service or a computing system on the internet) to generate the 3D model. The image data may be transmitting using, for example, a wireless connection (e.g., using a cellular data modem or a WiFi modem) or using a wired connection (e.g., a universal serial bus or USB connection).

As such, aspects of embodiments of the present invention are directed to systems and methods for improving the usability of 3D scanning systems by decoupling the scanning sensor from the display device on which a live view of the scanning process is shown to a user. This decoupling allows a user to receive real-time feedback during the scanning process while moving the scanning sensors to locations where it would be difficult or substantially impossible to view the display if the display were rigidly coupled to the camera.

In some embodiments, having a decoupled system architecture enables balancing the scanning workload between the two components. For instance, the scanner sensor may perform certain image processing or depth calculations, or even some aspects of 3D reconstruction such as estimating camera location and pose, thus reducing the workload on the companion scanning device, or perhaps reducing or regulating the bandwidth requirement of the wireline or wireless connection between the scanner and the sensor modules. Other embodiments may have multiple sensor modules using a central viewing scanning device for scanning speed up and such.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A three-dimensional scanning system comprising:
   a handheld scanning sensor comprising:
      an image sensor;
      a second image sensor arranged to have an overlapping field of view with the image sensor;
      an illumination source configured to emit light in a direction of a field of view of the image sensor;
      an inertial measurement unit configured to measure a position and orientation of the handheld scanning sensor; and
      a client communication interface; and
   a handheld scanning device physically separate from the handheld scanning sensor, the handheld scanning device comprising:
      a processor and memory;
      a screen; and
      a host communication interface,
      the memory storing instructions that, when executed by the processor, cause the processor to:
         control the handheld scanning sensor to capture a first pair of images using the image sensor and the second image sensor while controlling the illumination source to emit light in the direction of the field of view of the image sensor;
         receive the images from the handheld scanning sensor through the host communication interface;
         receive the orientations and positions of the handheld scanning sensor when capturing the images;
         compute a three-dimensional model from the images and the orientations and positions of the handheld scanning sensor; and
         display the three-dimensional model on the screen in real time.

2. The three-dimensional scanning system of claim 1, wherein the memory further stores instructions that, when executed by the processor, cause the processor to overlay a rendering of the three-dimensional model on the screen over the images received from the handheld scanning sensor.

3. The three-dimensional scanning system of claim 1, wherein the illumination source is configured to emit:
   structured light;
   coded light; or
   light having a pattern.

4. The three-dimensional scanning system of claim 1, wherein the client communication interface and the host communication interface are wired interfaces.

5. The three-dimensional scanning system of claim 1, wherein the client communication interface and the host communication interface are wireless interfaces.

6. The three-dimensional scanning system of claim 1, wherein the scanning sensor comprises a depth camera, wherein the depth camera is:
   a stereo vision depth camera;
   a time of flight depth camera; or
   a fusion color and infrared camera.

7. A handheld three-dimensional scanning sensor comprising:
   a depth camera comprising:
      an image sensor;
      a second image sensor arranged to have an overlapping field of view with the image sensor; and
      an illumination source configured to emit light in a direction of a field of view of the image sensor;
   a client communication interface;

an inertial measurement unit configured to measure orientation and position information of the three-dimensional scanning sensor;

a controller; and a memory having instructions stored thereon that, when executed by the controller, cause the controller to:

control the image sensor and the second image sensor of the depth camera to capture an image while controlling the illumination source to emit light in the direction of the field of view of the image sensor;

receive orientation and position information from the inertial measurement unit when the depth camera captures the image; and transmit the image and the orientation and position information over the client communication interface.

8. The three-dimensional scanning sensor of claim 7, further comprising a dock configured to be attached to a scanning device.

9. The three-dimensional scanning sensor of claim 8, wherein the dock comprises a plug configured to connect to a receptacle of the scanning device.

10. A method for controlling a three-dimensional scanning system comprising a handheld scanning device and a handheld scanning sensor, the scanning sensor being physically separate from the scanning device, the method comprising:

controlling, by a processor of the scanning device, a first image sensor and a second image sensor of the scanning sensor to capture a first pair of images while controlling an illumination source of the scanning sensor to emit light in a direction of a field of view of the first image sensor;

receiving, by the processor, from the scanning sensor, the first pair of images and first orientation and position information from an inertial measurement unit of the scanning sensor;

initializing, by the processor, a three-dimensional model based on the first pair of images and the first orientation and position information;

controlling, by the processor, the scanning sensor to capture a second pair of images;

receiving, by the processor, from the scanning sensor, the second pair of images and second orientation and position information from the inertial measurement unit of the scanning sensor;

updating, by the processor, the three-dimensional model based on the second pair of images and the second orientation and position information; and displaying, by the processor, the three-dimensional model on a display of the handheld scanning device.

11. The method of claim 10, further comprising:

before outputting the three-dimensional model, determining whether to continue scanning or to stop scanning;

in response to determining to continue scanning, controlling the scanning sensor to capture a third image; and in response to determining to stop scanning, finalizing the three-dimensional model.

12. The method of claim 11, wherein the determining whether to continue scanning or to stop scanning comprises determining whether the three-dimensional model has a gap.

13. The method of claim 11, wherein the determining whether to continue scanning or to stop scanning comprises:

receiving orientation information from the inertial measurement unit of the scanning sensor; and determining whether the scanning sensor has completed a full rotation.

14. The method of claim 10, wherein the updating the three-dimensional model comprises:

transmitting the second image and the second orientation and position information to a remote processing system; and receiving, from the remote processing system, the updated three-dimensional model.

15. The three-dimensional scanning system of claim 1, wherein the memory of the handheld scanning device further stores instructions that, when executed by the processor of the handheld scanning device, cause the handheld scanning device to determine whether to continue scanning based on at least one of:

the computed three-dimensional model; and the orientations and positions of the handheld scanning sensor.

* * * * *